US012639551B2

(12) United States Patent
Mo et al.

(10) Patent No.: US 12,639,551 B2
(45) Date of Patent: May 26, 2026

(54) PROCESSING METHOD, DEVICE, AND SYSTEM

(71) Applicant: Lenovo (Beijing) Limited, Beijing (CN)

(72) Inventors: Zhijian Mo, Beijing (CN); Qihua Xiao, Beijing (CN); Yong Cheng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 658 days.

(21) Appl. No.: 18/181,346

(22) Filed: Mar. 9, 2023

(65) Prior Publication Data

US 2023/0316047 A1     Oct. 5, 2023

(30) Foreign Application Priority Data

Mar. 31, 2022     (CN) .......................... 202210332774.9

(51) Int. Cl.
*G06N 3/045* (2023.01)
*G06F 8/61* (2018.01)

(52) U.S. Cl.
CPC ............... *G06N 3/045* (2023.01); *G06F 8/61* (2013.01)

(58) Field of Classification Search
CPC ..................................... G06F 1/32; G06F 9/44
See application file for complete search history.

(56) References Cited

U.S. PATENT DOCUMENTS

2022/0172828 A1* 6/2022 Qiu ....................... G06T 7/0014
2022/0261306 A1* 8/2022 Chandrasekaran ..........................
                                                  G06F 11/1438

* cited by examiner

*Primary Examiner* — Keshab R Pandey
(74) *Attorney, Agent, or Firm* — ANOVA LAW GROUP, PLLC

(57) ABSTRACT

A processing method includes: obtaining, by a first processing unit, a first monitoring data from a first sensing unit, the first sensing unit monitoring a target parameter provided by a power supply to a target processing unit, and the target parameter representing performance of the target processing unit in a running state; obtaining, by the first processing unit, a second monitoring data from an intelligent engine, the intelligent engine in the running state managing a currently running target program; matching, by the first processing unit, the first monitoring data and the second monitoring data with a smart scenario model to determine an application scenario of an electronic device; and adjusting, by the first processing unit, the target parameter of the target processing unit based on the application scenario.

18 Claims, 10 Drawing Sheets

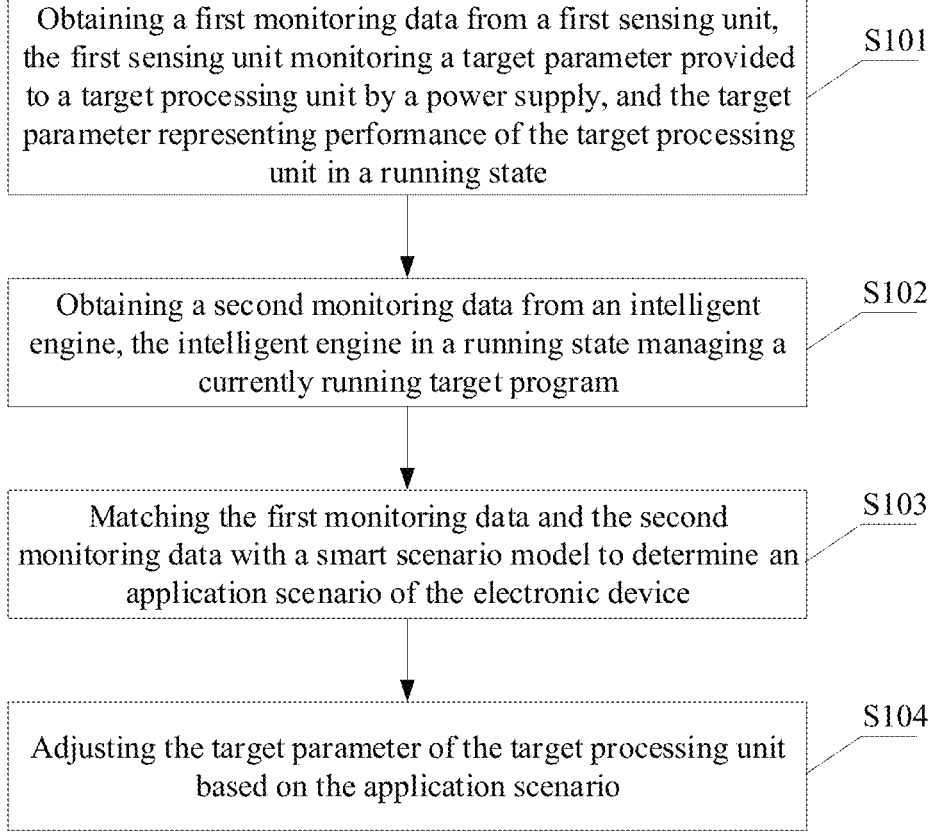

Obtaining a first monitoring data from a first sensing unit, the first sensing unit monitoring a target parameter provided to a target processing unit by a power supply, and the target parameter representing performance of the target processing unit in a running state — S101

Obtaining a second monitoring data from an intelligent engine, the intelligent engine in a running state managing a currently running target program — S102

Matching the first monitoring data and the second monitoring data with a smart scenario model to determine an application scenario of the electronic device — S103

Adjusting the target parameter of the target processing unit based on the application scenario — S104

FIG. 1

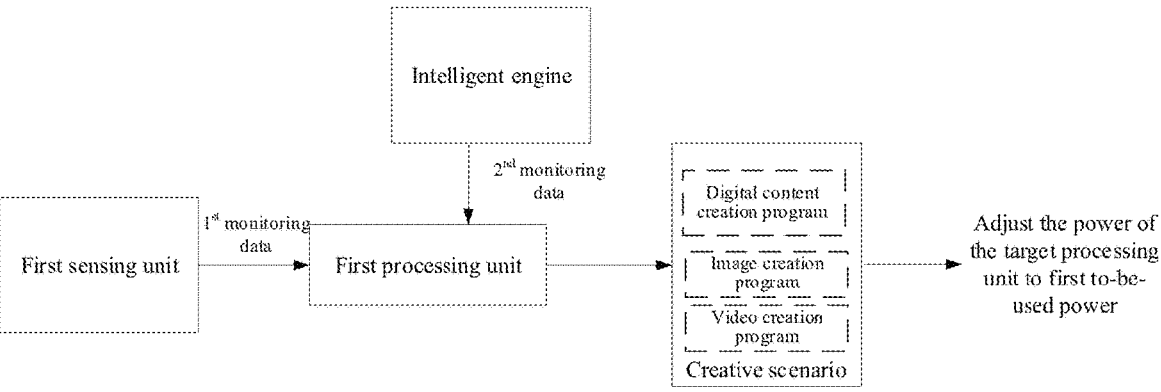
FIG. 6A
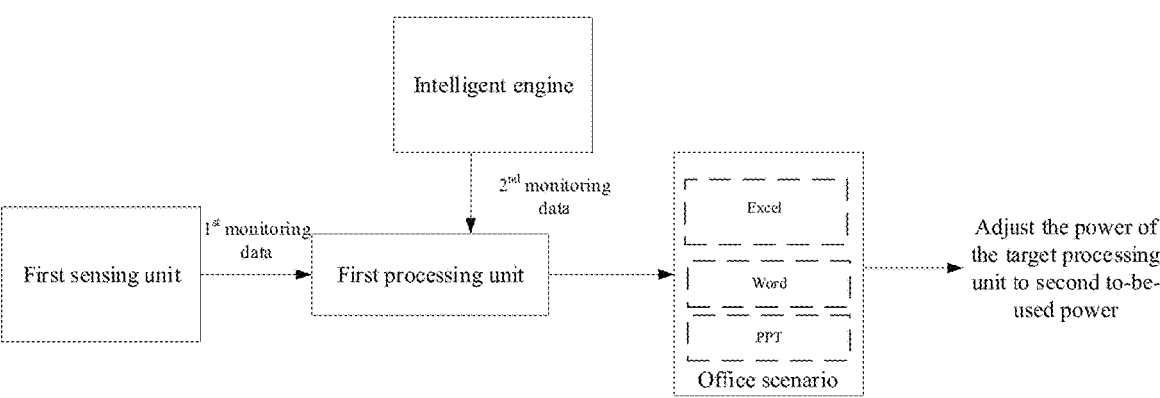
FIG. 6B
FIG. 6

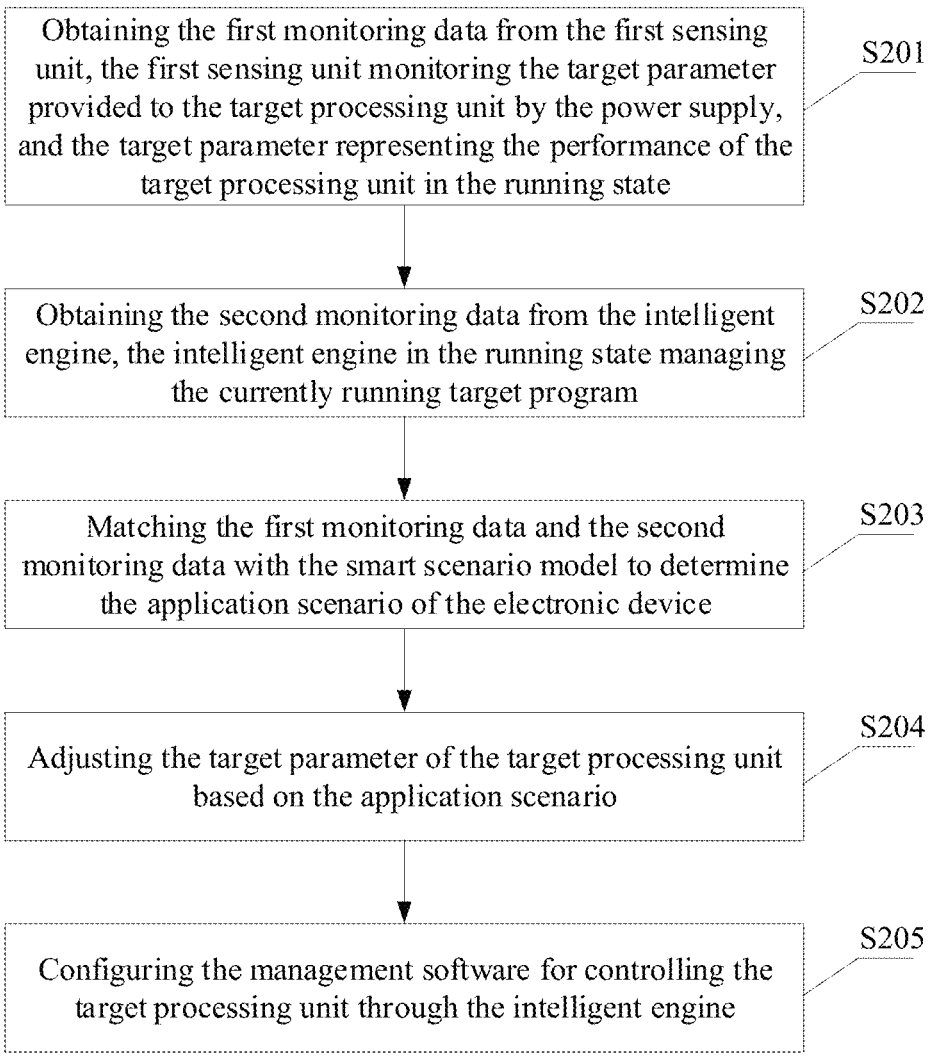

Obtaining the first monitoring data from the first sensing unit, the first sensing unit monitoring the target parameter provided to the target processing unit by the power supply, and the target parameter representing the performance of the target processing unit in the running state — S201

Obtaining the second monitoring data from the intelligent engine, the intelligent engine in the running state managing the currently running target program — S202

Matching the first monitoring data and the second monitoring data with the smart scenario model to determine the application scenario of the electronic device — S203

Adjusting the target parameter of the target processing unit based on the application scenario — S204

Configuring the management software for controlling the target processing unit through the intelligent engine — S205

FIG. 7

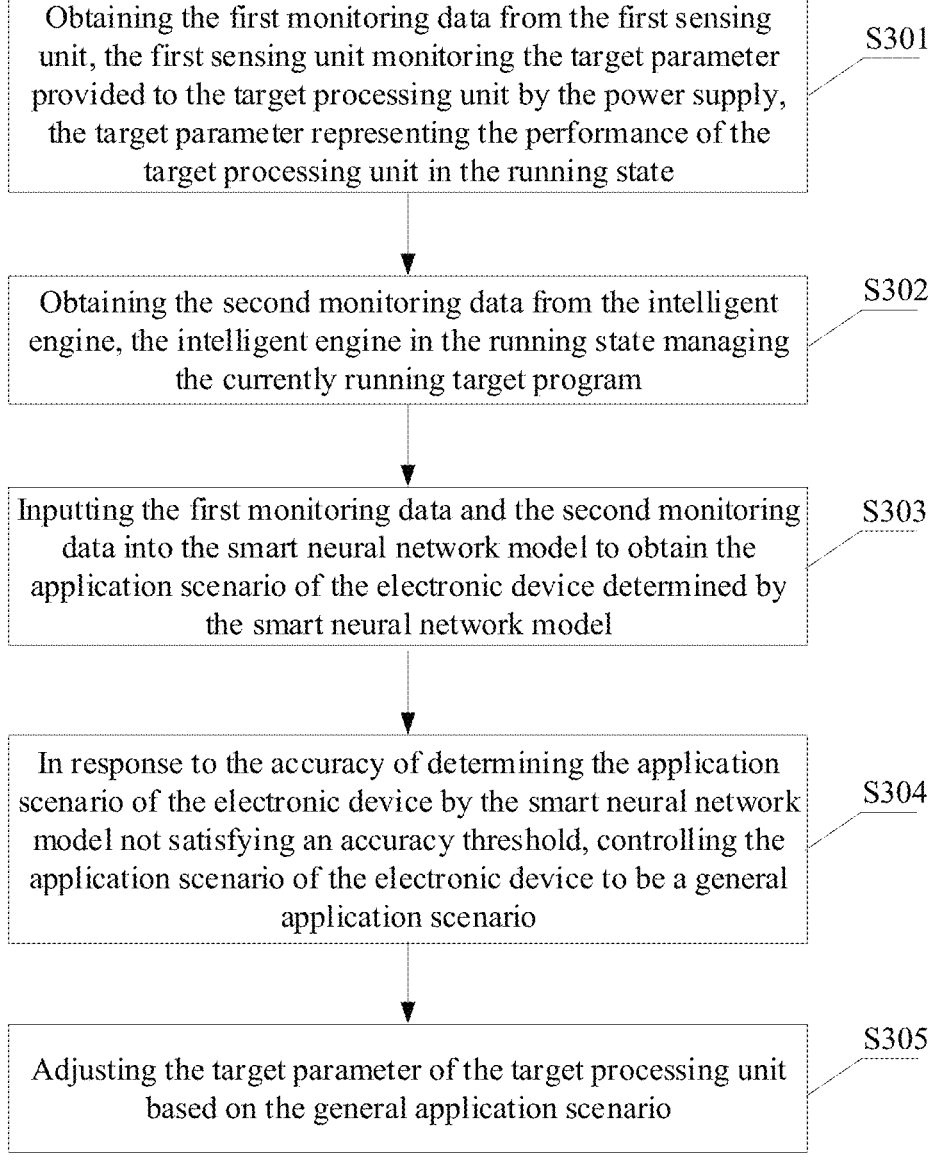

Obtaining the first monitoring data from the first sensing unit, the first sensing unit monitoring the target parameter provided to the target processing unit by the power supply, the target parameter representing the performance of the target processing unit in the running state — S301

Obtaining the second monitoring data from the intelligent engine, the intelligent engine in the running state managing the currently running target program — S302

Inputting the first monitoring data and the second monitoring data into the smart neural network model to obtain the application scenario of the electronic device determined by the smart neural network model — S303

In response to the accuracy of determining the application scenario of the electronic device by the smart neural network model not satisfying an accuracy threshold, controlling the application scenario of the electronic device to be a general application scenario — S304

Adjusting the target parameter of the target processing unit based on the general application scenario — S305

FIG. 8

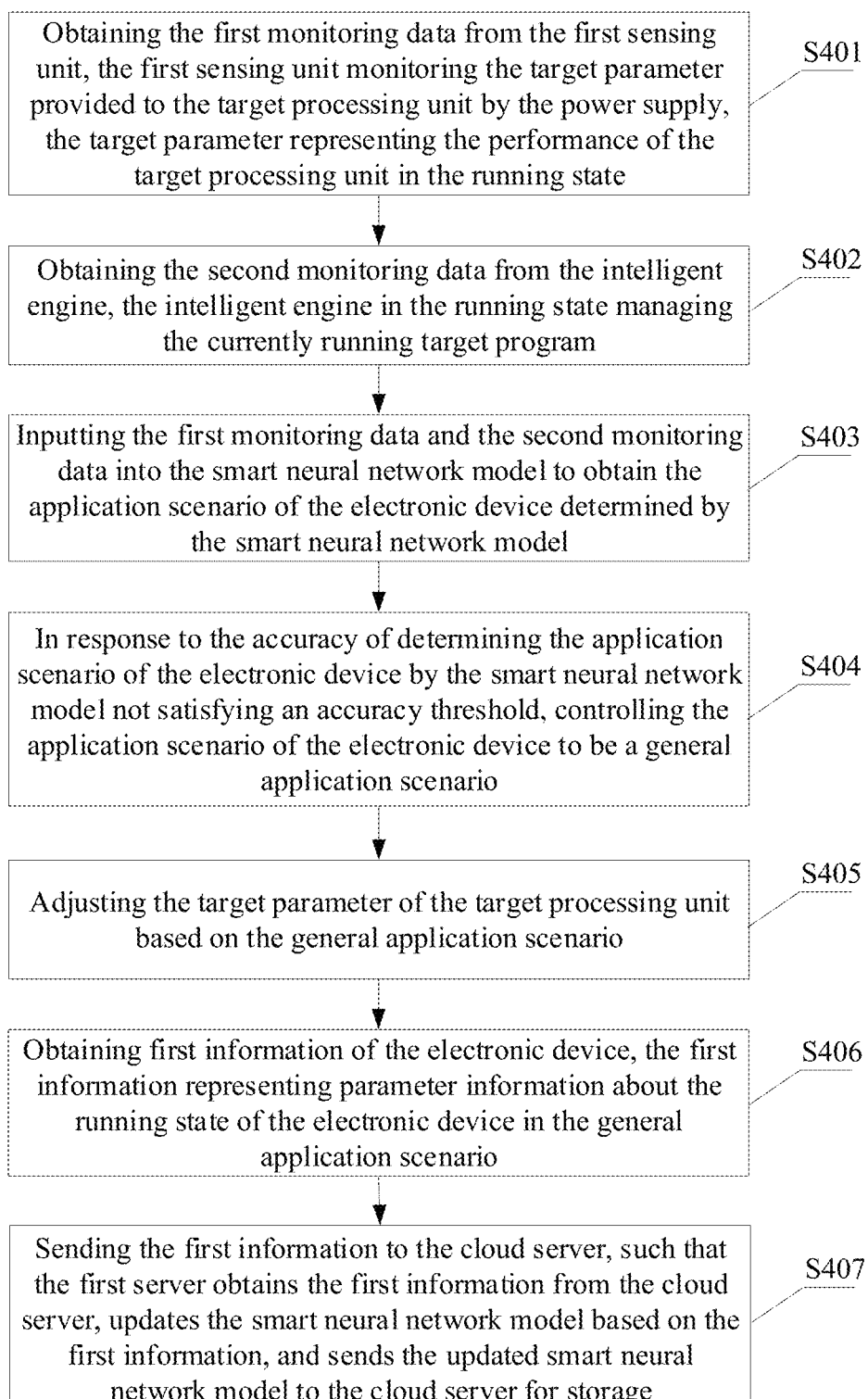

Obtaining the first monitoring data from the first sensing unit, the first sensing unit monitoring the target parameter provided to the target processing unit by the power supply, the target parameter representing the performance of the target processing unit in the running state — S401

Obtaining the second monitoring data from the intelligent engine, the intelligent engine in the running state managing the currently running target program — S402

Inputting the first monitoring data and the second monitoring data into the smart neural network model to obtain the application scenario of the electronic device determined by the smart neural network model — S403

In response to the accuracy of determining the application scenario of the electronic device by the smart neural network model not satisfying an accuracy threshold, controlling the application scenario of the electronic device to be a general application scenario — S404

Adjusting the target parameter of the target processing unit based on the general application scenario — S405

Obtaining first information of the electronic device, the first information representing parameter information about the running state of the electronic device in the general application scenario — S406

Sending the first information to the cloud server, such that the first server obtains the first information from the cloud server, updates the smart neural network model based on the first information, and sends the updated smart neural network model to the cloud server for storage — S407

FIG. 9

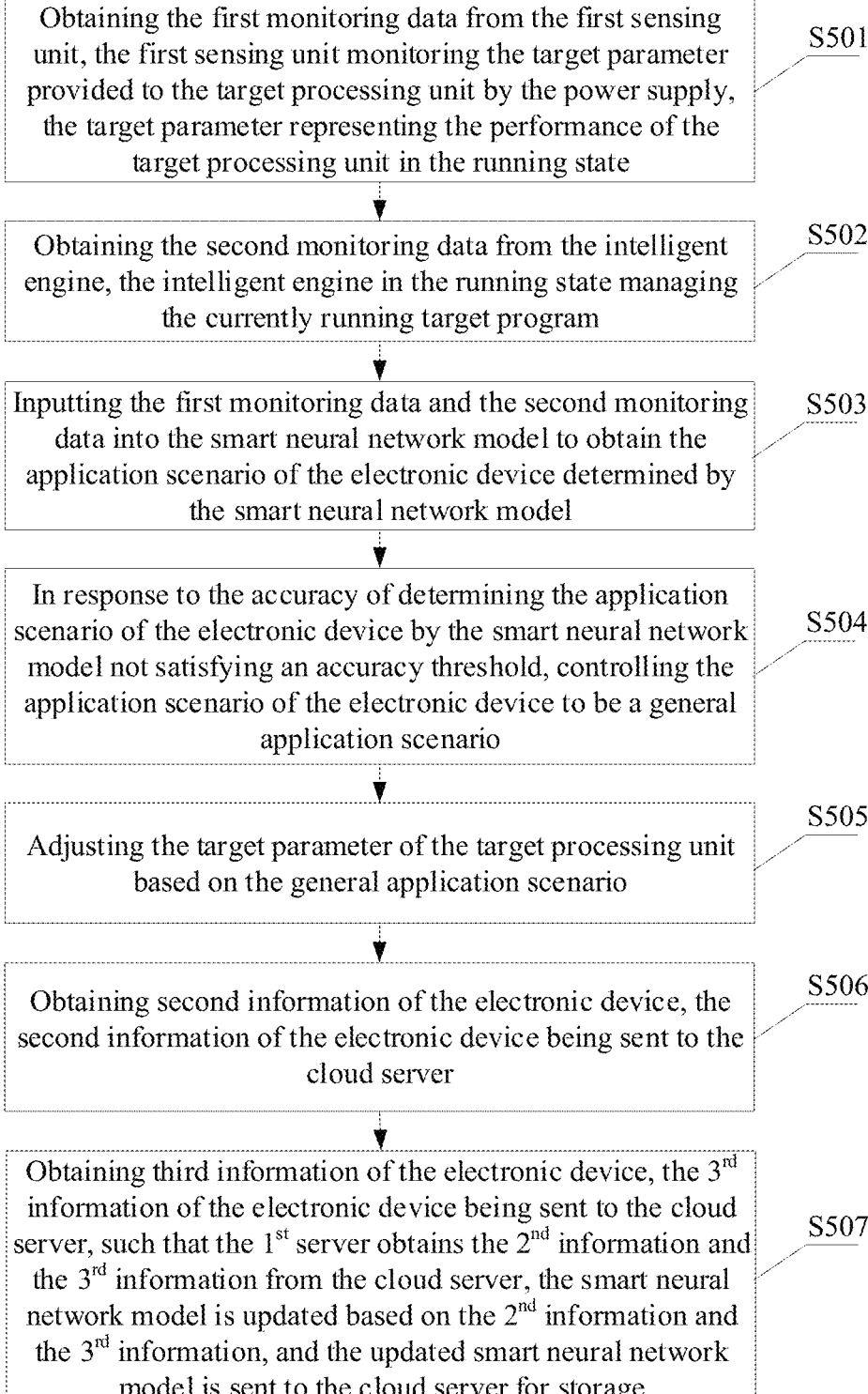

Obtaining the first monitoring data from the first sensing unit, the first sensing unit monitoring the target parameter provided to the target processing unit by the power supply, the target parameter representing the performance of the target processing unit in the running state ⟶ S501

Obtaining the second monitoring data from the intelligent engine, the intelligent engine in the running state managing the currently running target program ⟶ S502

Inputting the first monitoring data and the second monitoring data into the smart neural network model to obtain the application scenario of the electronic device determined by the smart neural network model ⟶ S503

In response to the accuracy of determining the application scenario of the electronic device by the smart neural network model not satisfying an accuracy threshold, controlling the application scenario of the electronic device to be a general application scenario ⟶ S504

Adjusting the target parameter of the target processing unit based on the general application scenario ⟶ S505

Obtaining second information of the electronic device, the second information of the electronic device being sent to the cloud server ⟶ S506

Obtaining third information of the electronic device, the 3rd information of the electronic device being sent to the cloud server, such that the 1st server obtains the 2nd information and the 3rd information from the cloud server, the smart neural network model is updated based on the 2nd information and the 3rd information, and the updated smart neural network model is sent to the cloud server for storage ⟶ S507

FIG. 11

PROCESSING METHOD, DEVICE, AND SYSTEM

CROSS-REFERENCE TO RELATED APPLICATION

This application claims priority to Chinese Patent Application No. 202210332774.9, filed on Mar. 31, 2022, the entire content of which is incorporated herein by reference.

TECHNICAL FIELD

The present disclosure relates to the technical field of computers and, more particularly, to a processing method, device, and system.

BACKGROUND

Currently, an electronic device is often provided with multiple performance modes to meet different usage requirements of users. Hardware operation performance of the electronic device is different in different performance modes.

However, a user is currently required to manually switch the performance mode to adjust hardware parameters of the electronic device according to the switching of the performance mode. As a result, the parameter adjustment of the electronic device is inaccurate and inflexible.

SUMMARY

One aspect of the present disclosure provides a processing method. The processing method includes: obtaining, by a first processing unit, a first monitoring data from a first sensing unit, the first sensing unit monitoring a target parameter provided by a power supply to a target processing unit, and the target parameter representing performance of the target processing unit in a running state; obtaining, by the first processing unit, a second monitoring data from an intelligent engine, the intelligent engine in the running state managing a currently running target program; matching, by the first processing unit, the first monitoring data and the second monitoring data with a smart scenario model to determine an application scenario of an electronic device; and adjusting, by the first processing unit, the target parameter of the target processing unit based on the application scenario.

Another aspect of the present disclosure provides a processing device. The processing device includes a memory storing program instructions and a processor coupled to the memory. When being executed by the processor, the program instructions cause the processor to: obtain a first monitoring data from a first sensing unit, the first sensing unit monitoring a target parameter provided by a power supply to a target processing unit, and the target parameter representing performance of the target processing unit in a running state; obtain a second monitoring data from an intelligent engine, the intelligent engine in the running state managing a currently running target program; match the first monitoring data and the second monitoring data with a smart scenario model to determine an application scenario of an electronic device; and adjust the target parameter of the target processing unit based on the application scenario.

Another aspect of the present disclosure provides a processing system. The processing system includes: a first sensing unit configured to monitor a target parameter provided by a power supply to a target processing unit, the target parameter representing performance of the target processing unit in a running state; an intelligent engine configured to manage a currently running target program when being in the ruing state; and a first processing unit configured to: obtain a first monitoring data from the first sensing unit; obtain a second monitoring data from the intelligent engine; match the first monitoring data and the second monitoring data with a smart scenario model to determine an application scenario of an electronic device; and adjust the target parameter of the target processing unit based on the application scenario.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

FIG. 1 is a flowchart of an exemplary processing method according to some embodiments of the present disclosure;

FIG. 6 is a schematic diagram of a scene of adjusting a target parameter of a target processing unit according to some embodiments of the present disclosure;

FIG. 7 is a flowchart of another exemplary processing method according to some embodiments of the present disclosure;

FIG. 8 is a flowchart of another exemplary processing method according to some embodiments of the present disclosure;

FIG. 9 is a flowchart of another exemplary processing method according to some embodiments of the present disclosure;

FIG. 11 is a flowchart of another exemplary processing method according to some embodiments of the present disclosure;

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

In the existing technologies, although a user can manually switch a performance mode, the number of times the user manually switches the performance mode is substantially small based on collected data of user's actual usage habits. Most users keep a default performance mode in a factory setting of the electronic device.

When the number of times the user manually switches the performance mode is substantially small, the electronic device is rarely used in the performance mode that matches an application scenario. That is, hardware of the electronic device hardly operates with parameters that match the application scenario. As a result, the electronic device is not effectively used, and the user experience is poor.

To solve the above problem, the present disclosure provides a processing method. The processing method is described in detail below.

FIG. 1 is a flowchart of an exemplary processing method according to some embodiments of the present disclosure. The processing method can be applied to the electronic device. Product types of the electronic device are not limited by the present disclosure. As shown in FIG. 1, the processing method includes the following processes.

At S101, a first processing unit obtains a first monitoring data from a first sensing unit. The first sensing unit monitors a target parameter provided to a target processing unit by a power supply. The target parameter represents performance of the target processing unit in a running state.

Figure 2:
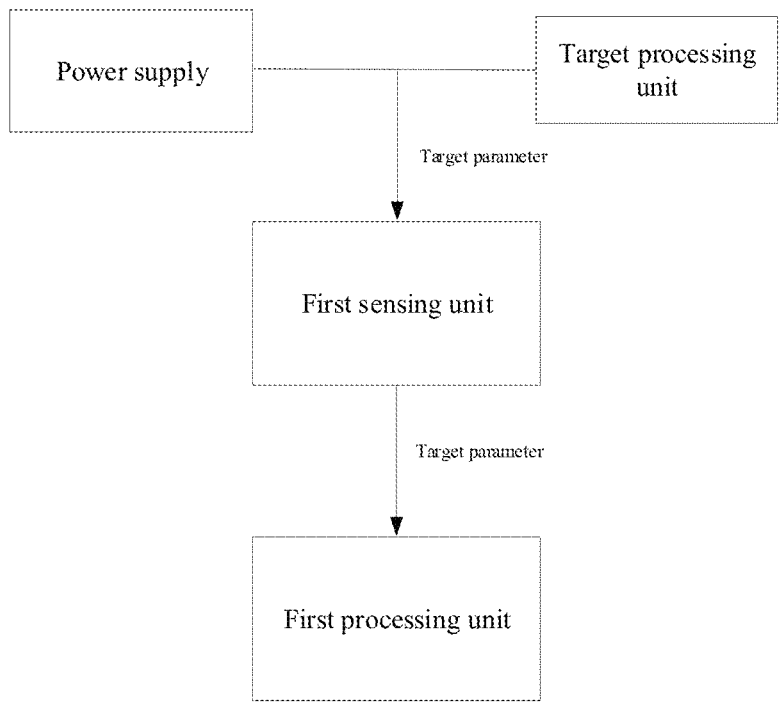
FIG. 2 is a schematic diagram of an interaction scene between a first sensing unit and a first processing unit according to some embodiments of the present disclosure.

In some embodiments, as shown in FIG. 2, the first sensing unit may monitor the target parameter provided to the target processing unit by the power supply and use the target parameter as the first monitoring data. For example, the first sensing unit may monitor one or more of a voltage, a current, and a power supplied to the target processing unit by the power supply, and may use the one of more of the voltage, the current, and the power supplied to the target processing unit by the power supply as the first monitoring data. Correspondingly, the first processing unit obtains the target parameter provided by the power supply to the target processing unit as monitored by the first sensing unit.

Figure 3:
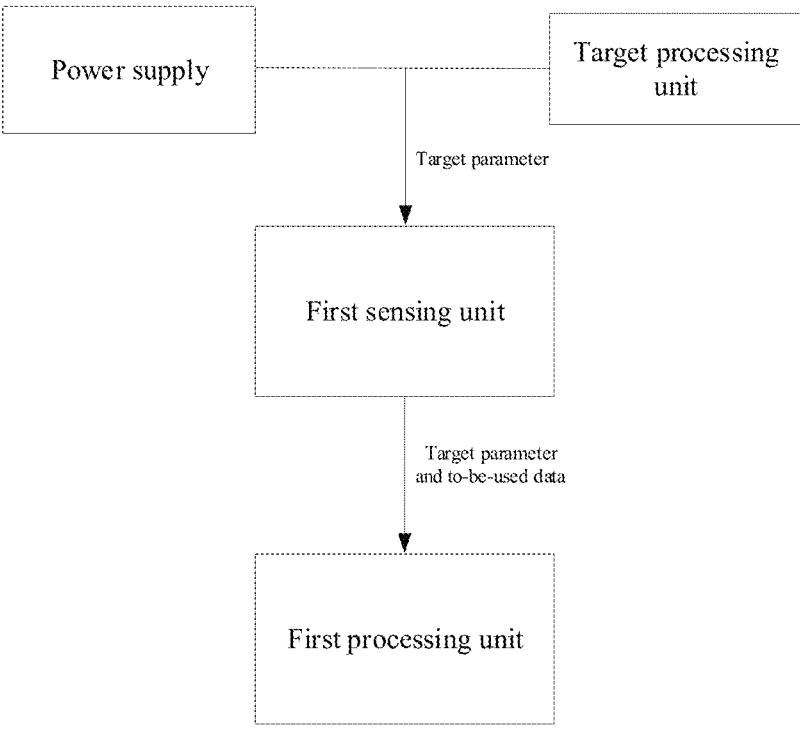
FIG. 3 is a schematic diagram of another interaction scene between a first sensing unit and a first processing unit according to some embodiments of the present disclosure.

As shown in FIG. 3, the first sensing unit may monitor the target parameter provided by the power supply to the target processing unit. A to-be-used data can be determined based on the target parameter. The target parameter and the to-be-used data form the first monitoring data. For example, the target parameter may include the voltage and the current. The power can be calculated based on the voltage and the current. The voltage, the current, and the power together form the first monitoring data. Correspondingly, the first processing unit obtains the target parameter provided by the power supply to the target processing unit as monitored by the first sensing unit, and determines the to-be-used data based on the target parameter.

In some embodiments, the target processing unit may include, but is not limited to, one or more of a central processing unit (CPU), a graphics processing unit (GPU), and a solid state disk (SD).

The first processing unit may include, but is not limited to, a chip with a computing capability. Types of the chip with the computing capability are not limited by the present disclosure.

The first sensing unit may include, but is not limited to, a power sensor.

At S102, the first processing unit obtains a second monitoring data from an intelligent engine. The intelligent engine in a running state manages a currently running target program.

Managing the currently running target program by the intelligent engine in the running state may include, but is not limited: monitoring data related to the currently running target program by the intelligent engine in the running state, and managing the currently running target program based on the data related to the currently running target program.

The intelligent engine in the running state may, but is not limited to: use the data related to the currently running target program as the second monitoring data.

The currently running target program may include, but is not limited to, one or more of an application program, a service process in an operating system, and a management software controlling the target processing unit.

In some embodiments, the target processing unit is the CPU or the GPU, the management software controlling the target processing unit may be used to control the CPU or the GPU to switch from a first frequency to a second frequency. The second frequency is higher than the first frequency.

Data related to the application program may include, but is not limited to, user interaction information and network traffic information corresponding to the application program.

The service process in the operating system may include an operating system process and/or a user processes. The operating system process may be a process for completing a service provided by the operating system. The user process may include a process corresponding to the application program and/or a process corresponding to the management software controlling the target processing unit.

Data related to the service process in the operating system at least includes a utilization rate of the target processing unit corresponding to the operating system process and/or a utilization rate of the target processing unit corresponding to the user process.

Data related to the management software controlling the target processing unit may include network traffic information corresponding to the management software controlling the target processing unit in the running state and/or operation data of the management software controlling the target processing unit in the running state.

A method in which the intelligent engine in the running state manages the currently running target program is not limited by the present disclosure. For example, based on the data related to the currently running target program, it can be determined that the application program is in a background running state, and a duration of the background running state exceeds a predetermined duration threshold. Then, the application program in the background running state is terminated.

Referring back to FIG. 1, at S103, the first processing unit matches the first monitoring data and the second monitoring data with a smart scenario model to determine an application scenario of the electronic device.

S103 may include, but is not limited to the following processes.

At S1031, search the application scenario of the electronic device corresponding to the first monitoring data and the second monitoring data in the smart scenario model.

In some embodiments, the smart scenario model may include a mapping relationship between monitoring data and the application scenario. Correspondingly, searching the application scenario of the electronic device corresponding to the first monitoring data and the second monitoring data in the smart scenario model may include: searching the monitoring data corresponding to the first monitoring data and the second monitoring data in the smart scenario model, and determining the application scenario corresponding to the monitoring data in the smart scenario model as the application scenario of the electronic device.

Of course, the smart scenario model can also be a smart neural network model. Correspondingly, S103 may also include, but is not limited to the following processes.

At S1032, inputting the first monitoring data and the second monitoring data into the smart neural network model to obtain the application scenario of the electronic device determined by the smart neural network model.

Figure 4:
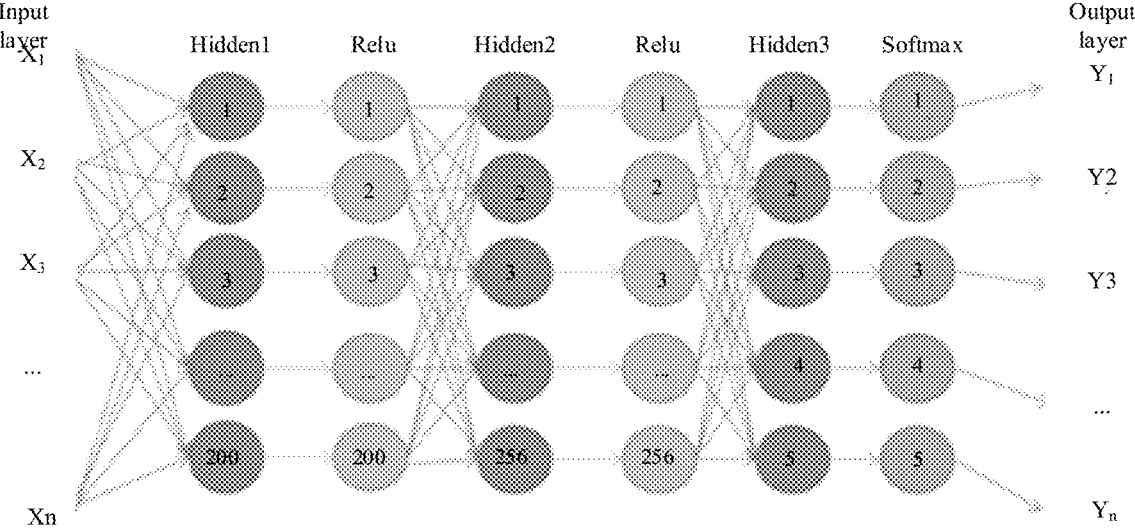
FIG. 4 is a schematic structural diagram of an exemplary smart neural network model according to some embodiments of the present disclosure.

As shown in FIG. 4, the smart neural network model may include but is not limited to: an input layer, a Relu layer, a hidden layer, a softmax layer, and an output layer. The first monitoring data and the second monitoring data are inputted to the input layer, and are calculated through the Relu layer, the hidden layer, and the softmax layer to obtain the application scenario of the electronic device. The application scenario of the electronic device is outputted to through the output layer.

As shown in FIG. 4, the output layers Y1, Y2 are only examples showing the smart neural network model capable of determining a plurality of application scenarios. However, only one application scenario is determined and outputted by the smart neural network model at a certain moment.

FIG. 4 is only an example of the smart neural network mode, and should not be construed as a limitation to the smart neural network model.

In some embodiments, the smart neural network model may be obtained by the electronic device from a cloud server, and the smart neural network model in the cloud server is obtained from a first server.

Figure 5:
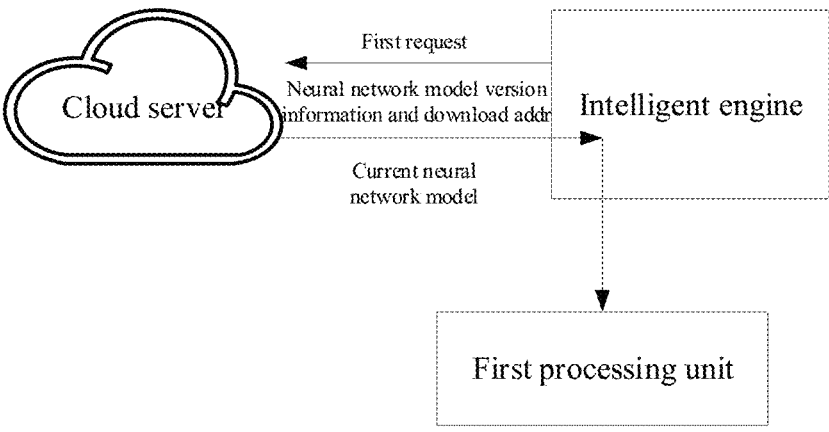
FIG. 5 is a schematic diagram of a scene of obtaining an exemplary smart neural network model according to some embodiments of the present disclosure.

FIG. 5 is a schematic diagram of a scene of obtaining an exemplary smart neural network model according to some embodiments of the present disclosure. As shown in FIG. 5, obtaining the smart neural network model from the cloud server by the electronic device may include the following processes.

At S10321, the intelligent engine sends a first request to the cloud server, and obtains version information of a neural network model and a download address of the neural network model returned by the cloud server in response to the first request.

At S10322, if the neural network model version information indicates that the current neural network model in the cloud server is newer than the smart neural network model of the electronic device, the intelligent engine obtains the current neural network model in the cloud server based on the download address of the neural network model, and replaces the smart neural network model of the electronic device with the current neural network model obtained from the cloud server.

The intelligent engine stores the current neural network model in the cloud server to the first processing unit.

Of course, if the neural network model version information indicates that the current neural network model in the cloud service is the same as the smart neural network model of the electronic device, then the electronic device continues to use the smart neural network model of the electronic device.

The first server can determine the smart neural network model in the following manner.

At S10323, the monitoring data of the electronic device and a first application scenario tag marked on the monitoring data are obtained from the cloud server. The monitoring data includes a first historical monitoring data of the first sensing unit and a second historical monitoring data of the intelligent engine.

The first historical monitoring data is obtained by the first sensing unit through monitoring the target parameter provided by the power supply to the target processing unit at a moment preceding a current moment. The target parameter is used to indicate a performance of the target processing unit in the running state. The second historical monitoring data is obtained by the intelligent engine in the running state through managing the running target program at the moment preceding the current moment.

At S10324, the first server uses the monitoring data and the first application scenarios tag marked on the monitoring data as training data to train the neural network model to obtain the smart neural network model.

The application scenario of the electronic device may include but is not limited to: an idle scenario, an office scenario, an online meeting scenario, a web page browsing scenario, a creative scenario, or a game scenario.

In the idle scenario, the operating system presents a desktop, but no user performs any operation. In the office scenario, the electronic device is used for office work. In the online meeting scenario, the electronic device is used for an online meeting. In the web page browsing scenario, the electronic device is used to browse web pages. In the creative scenario, the electronic device is used to perform digital content creation, image creation, or video creation. In the game scenario, the electronic device is used for playing a game.

Referring back to FIG. 1, at S104, the first processing unit adjusts the target parameter of the target processing unit based on the application scenario.

Adjusting the target parameter of the target processing unit by the first processing unit based on the application scenario may include but is not limited the following processes. The first processing unit sends the application scenario to basic input output system (BIOS). The BIOS determines a first to-be-used parameter corresponding to the application scenario for the target processing unit, and adjusts the target parameter of the target processing unit to the first to-be-used parameter.

The target parameter of the target processing unit is adjusted based on the application scenario, such that the target processing unit in the running state is able to satisfy an application requirement corresponding to the application scenario. The application scenario may correspond to one or more application programs. Application programs corresponding to different application scenarios have different performance requirements for the target processing unit. Correspondingly, different target parameters may be adjusted for the target processing unit based on different application scenarios. For example, as shown in FIG. 6A, the first processing unit determines at a first moment that the application scenario of the electronic device is the creative scenario. Based on the creative scenario, the power of the target processing unit is adjusted to a first to-be-used power, such that the target processing unit is able to satisfy the application requirements for a digital content creation program, an image creation program, and a video creation program corresponding to the creative scenario. In another example, as shown in FIG. 6B, the first processing unit determines at a second moment that the application scenario of the electronic device is the office scenario. Based on the office scenario, the power of the target processing unit is adjusted to a second to-be-used power, such that the target processing unit is able to satisfy the application requirement for an office software (e.g., Excel, Word, or Power-point) corresponding to the office scenario.

In some embodiments, the first processing unit obtains the first monitoring data from the sensing unit and the second monitoring data from the intelligent engine, and matches the first monitoring data and the second monitoring data with the smart scenario model to determine the application scenario of the electronic device. Based on the data related to the target processing unit of the electronic device and the data related to the currently running target program, the first processing unit determines the application scenario of the electronic device. Thus, the application scenario of the electronic device can be accurately determined. Then, the first processing unit adjusts the target parameter of the target processing unit based on the application scenario, thereby improving the accuracy and flexibility of target parameter adjustment and improving user experience.

FIG. 7 is a flowchart of another exemplary processing method according to some embodiments of the present disclosure. The processing method in FIG. 7 is an extension of the processing method in FIG. 1. As shown in FIG. 7, the processing method includes the following processes.

At S201, the first processing unit obtains the first monitoring data from the first sensing unit. The first sensing unit monitors the target parameter provided to the target processing unit by the power supply. The target parameter represents the performance of the target processing unit in the running state.

At 202, the first processing unit obtains the second monitoring data from the intelligent engine. The intelligent engine in the running state manages the currently running target program.

At S203, the first processing unit matches the first monitoring data and the second monitoring data with the smart scenario model to determine the application scenario of the electronic device.

At S204, the first processing unit adjusts the target parameter of the target processing unit based on the application scenario.

For the detailed description of S201-S204, reference may be made to the relevant description of S101-S104 in FIG. 1, which will not be repeated herein.

At S205, the first processing unit configures the management software for controlling the target processing unit through the intelligent engine.

S205 may include but is not limited the following processes.

At S2051, the first processing unit obtains running state data of the management software for controlling the target processing unit.

At S2052, the first processing unit adjusts the running state of the management software for controlling the target processing unit through the intelligent engine based on the application scenario and the running state data of the management software for controlling the target processing unit.

For example, the target processing unit is the CPU, and the application scenario is the office scenario. If the running state data of the management software for controlling the CPU indicates that the running state of the management software for controlling the CPU is to control the CPU to switch from first frequency to the second frequency. The second frequency is higher than the first frequency. The first processing unit determines that the CPU does not need to operate at a higher frequency based on the office scenario.

Through the intelligent engine, the first processing unit adjusts the running state of the management software for controlling the CPU by controlling the CPU to switch from the second frequency to the first frequency.

In the embodiments of the present disclosure, the first processing unit obtains the first monitoring data from the first sensing unit and the second monitoring data from the intelligent engine, and matches the first monitoring data and the second monitoring data with the smart scenario model to determine the application scenario of the electronic device. As such, the first processing unit is able to determine the application scenario of the electronic device based on the data related to the target processing unit of the electronic device and the data related to the currently running target program, thereby ensuring the accuracy of determining the application scenario of the electronic device. The first processing unit then adjusts the target parameter of the target processing unit based on the application scenario. Thus, the accuracy and flexibility of the target parameter adjustment are improved, and the user experience is improved.

Moreover, in addition to adjusting the target parameter of the target processing unit, the first processing unit further configures the management software for controlling the target processing unit through the intelligent, thereby further improving an efficiency of using the electronic device and improving the user experience.

FIG. 8 is a flowchart of another exemplary processing method according to some embodiments of the present disclosure. The processing method in FIG. 8 is an extension of the processing method in FIG. 1. As shown in FIG. 8, the processing method includes the following processes.

At S301, the first processing unit obtains the first monitoring data from the first sensing unit. The first sensing unit monitors the target parameter provided to the target processing unit by the power supply. The target parameter represents the performance of the target processing unit in the running state.

At 302, the first processing unit obtains the second monitoring data from the intelligent engine. The intelligent engine in the running state manages the currently running target program.

For the detailed description of S301-S302, reference may be made to the relevant description of S101-S102 in FIG. 1, which will not be repeated herein.

At S303, the first processing unit inputs the first monitoring data and the second monitoring data into the smart neural network model to obtain the application scenario of the electronic device determined by the smart neural network model.

S303 is an example of S103 in FIG. 1.

At S304, if the accuracy of determining the application scenario of the electronic device by the smart neural network model does not satisfy an accuracy threshold, the application scenario of the electronic device is controlled to be a general application scenario.

The accuracy of determining the application scenario of the electronic device by the smart neural network model not satisfying the accuracy threshold may include but is not limited to the following processes.

At S3041, a reference application scenario of the electronic device determined by the smart neural network model is obtained. For example, training data of the smart neural network model may be obtained. The reference application scenario is the application scenario of the electronic device in the training data that matches the monitoring data.

As S3042, if the application scenario of the electronic device determined by the smart neural network model is not the reference application scenario of the electronic device, it is determined that the accuracy of determining the application scenario of the electronic device by the smart neural network model does not satisfy the accuracy threshold.

When the electronic device is used, in certain events (e.g., new application program being added to the electronic device, or multiple application programs running at the same time in the electronic device, and data related to the simultaneously running multiple application programs never being monitored), the obtained first monitoring data and the second monitoring data have never been processed by the smart neural network model. As a result, the application scenario of the electronic device determined by the smart neural network model is not the reference application scenario of the electronic device.

At S305, the first processing unit adjusts the target parameter of the target processing unit based on the general application scenario.

In some embodiments, the first processing unit sends the application scenario to the BIOS. The BIOS determines a second to-be-used parameter corresponding to the general application scenario for the target processing unit, and adjusts the target parameter of the target processing unit to the second to-be-used parameter.

The second-to-be-used parameter corresponding to the general application scenario at least ensures that the target processing unit in the running state is able to satisfy at least some of the application requirements of the application programs in the electronic device.

S305 is an example of S104 in FIG. 1.

In the embodiments of the present disclosure, the first processing unit obtains the first monitoring data from the first sensing unit and the second monitoring data from the intelligent engine, and inputs the first monitoring data and the second monitoring data into the smart neural network model to obtain the application scenario of the electronic device determined by the smart neural network model. If the accuracy of the application scenario of the electronic device determined by the smart neural network mode does not satisfy the accuracy threshold, the application scenario of the electronic device is controlled to be the general application scenario. The first processing unit adjusts the target parameter of the target processing unit based on the general application scenario. Thus, a probability of making errors in the target parameter adjustment is reduced, and the user experience is improved.

FIG. 9 is a flowchart of another exemplary processing method according to some embodiments of the present disclosure. The processing method in FIG. 9 is an extension of the processing method in FIG. 8. As shown in FIG. 9, the processing method includes the following processes.

At S401, the first processing unit obtains the first monitoring data from the first sensing unit. The first sensing unit monitors the target parameter provided to the target processing unit by the power supply. The target parameter represents the performance of the target processing unit in the running state.

At 402, the first processing unit obtains the second monitoring data from the intelligent engine. The intelligent engine in the running state manages the currently running target program.

At S403, the first processing unit inputs the first monitoring data and the second monitoring data into the smart neural network model to obtain the application scenario of the electronic device determined by the smart neural network model.

At S404, if the accuracy of determining the application scenario of the electronic device by the smart neural network model does not satisfy the accuracy threshold, the application scenario of the electronic device is controlled to be the general application scenario.

At S405, the first processing unit adjusts the target parameter of the target processing unit based on the general application scenario.

For the detailed description of S401-S405, reference may be made to the relevant description of S301-S305 in FIG. 8, which will not be repeated herein.

At S406, the intelligent engine obtains first information of the electronic device. The first information represents parameter information about the running state of the electronic device in the general application scenario.

Obtaining the first information from the electronic device by the smart intelligent engine may include but is not limited to the following processes.

At S4061, the intelligent engine obtains a third monitoring data from the first sensing unit by monitoring the target parameter provided by the power supply to the target processing unit of the electronic device in the general application scenario.

For the specific implementation manner of obtaining the third monitoring data from the first sensing unit by monitoring the target parameter provided by the power supply to the target processing unit of the electronic device in the general application scenario, reference can be made to the description of obtaining the first monitoring data by the first sensing unit in FIG. 1. The detail description thereof is omitted herein.

At S4062, the intelligent engine determines a fourth monitoring data by managing the target program running in the electronic device in the general application scenario.

For the specific implementation manner of determining the fourth monitoring data, reference can be made to the description of determining the second monitoring data by the intelligent engine at S102 in FIG. 1. The detail description thereof is omitted herein.

The first information includes the third monitoring data and the fourth monitoring data.

At S407, the intelligent engine sends the first information to the cloud server, such that the first server obtains the first information from the cloud server, updates the smart neural network model based on the first information, and sends the updated smart neural network model to the cloud server for storage.

Updating the smart neural network model based on the first information may include the following processes.

At S4071, the first server obtains a second application scenario tag marked with the first information. The second application scenario tag represents the application scenario of the electronic device corresponding to the first information.

At S4072, based on the first information and the second application scenario tag marked on the first information, the smart neural network model is updated to obtain the updated smart neural network model.

The updated smart neural network model has the same capability as the smart neural network model, and also has the capability of accurately determining the application scenario represented by the second application scenario tag.

Figure 10:
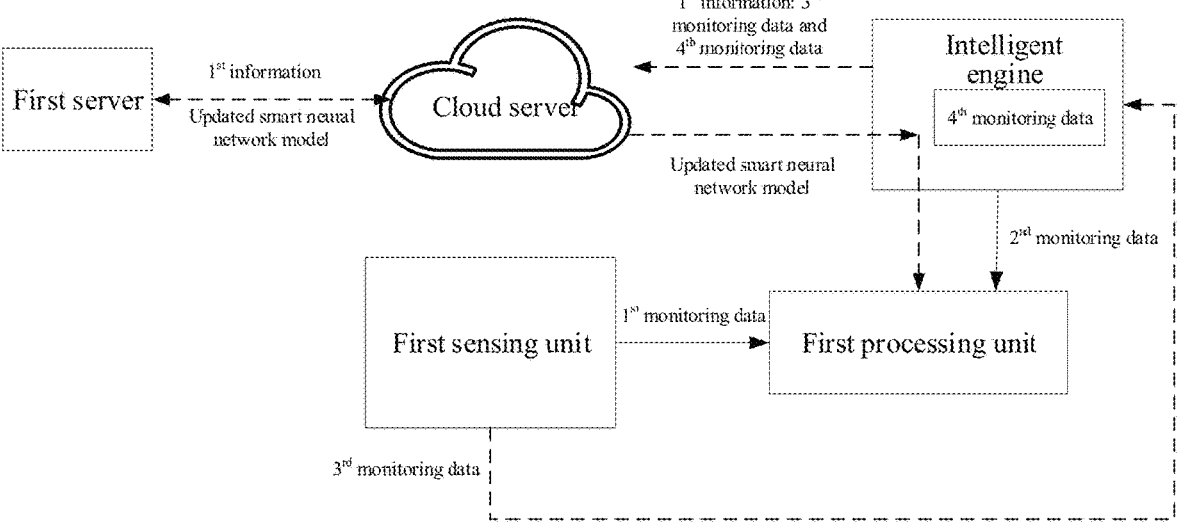
FIG. 10 is a schematic diagram of an implementation scene of an exemplary processing method according to some embodiments of the present disclosure.

FIG. 10 is a schematic diagram of an implementation scene of an exemplary processing method according to some embodiments of the present disclosure. As shown in FIG. 10, the first processing unit obtains the first monitoring data from the first sensing unit and the second monitoring data from the intelligent engine, and inputs the first monitoring data and the second monitoring data into the smart neural network model to obtain the application scenario of the electronic device determined by the smart neural network model. If the accuracy of the application scenario of the electronic device determined by the smart neural network model does not satisfy the accuracy threshold, the first processing unit controls the application scenario of the electronic device to be the general application scenario, and adjusts the target parameter of the target processing unit based on the general application scenario. The intelligent engine obtains the third monitoring data from the first sensing unit and the fourth monitoring data through managing the target program running in the electronic device in the general application scenario, and sends the first information including the third monitoring data and the fourth monitoring data to the cloud server. As such, the first server obtains the first information from the cloud server, updates the smart neural network model based on the first information to improve the accuracy of the application scenario determined by the smart neural network model, and sends the updated smart neural network model to the cloud server for storage. Thus, the intelligent engine obtains the updated smart neural network model from the cloud server and then transfers the updated smart neural network model to the first processing unit, thereby improving the accuracy of the target parameter adjustment and improving the user experience.

FIG. 11 is a flowchart of another exemplary processing method according to some embodiments of the present disclosure. The processing method in FIG. 11 is an extension of the processing method in FIG. 8. As shown in FIG. 11, the processing method includes the following processes.

At S501, the first processing unit obtains the first monitoring data from the first sensing unit. The first sensing unit monitors the target parameter provided to the target processing unit by the power supply. The target parameter represents the performance of the target processing unit in the running state.

At 502, the first processing unit obtains the second monitoring data from the intelligent engine. The intelligent engine in the running state manages the currently running target program.

At S503, the first processing unit inputs the first monitoring data and the second monitoring data into the smart neural network model to obtain the application scenario of the electronic device determined by the smart neural network model.

At S504, if the accuracy of determining the application scenario of the electronic device by the smart neural network model does not satisfy the accuracy threshold, the application scenario of the electronic device is controlled to be the general application scenario.

At S505, the first processing unit adjusts the target parameter of the target processing unit based on the general application scenario.

For the detailed description of S501-S505, reference may be made to the relevant description of S301-S305 in FIG. 8, which will not be repeated herein.

At S506, the intelligent engine obtains second information of the electronic device. The second information of the electronic device is sent to the cloud server.

The second information of the electronic device obtained by the intelligent engine may include: managing the target program running in the electronic device in the general application scenario by the intelligent engine to obtain the second information of the electronic device.

At S507, the first sensing unit obtains third information of the electronic device. The third information of the electronic device is sent to the cloud server. As a result, the first server obtains the second information and the third information from the cloud server. The smart neural network model is updated based on the second information and the third information. The updated smart neural network model is sent to the cloud server for storage.

Obtaining the third information from the electronic device by the first sensing unit may include: monitoring, by the first sensing unit, the target parameter provided by the power supply to the target processing unit in the electronic device in the general application scenario to obtain the third information of the electronic device.

Figure 12:
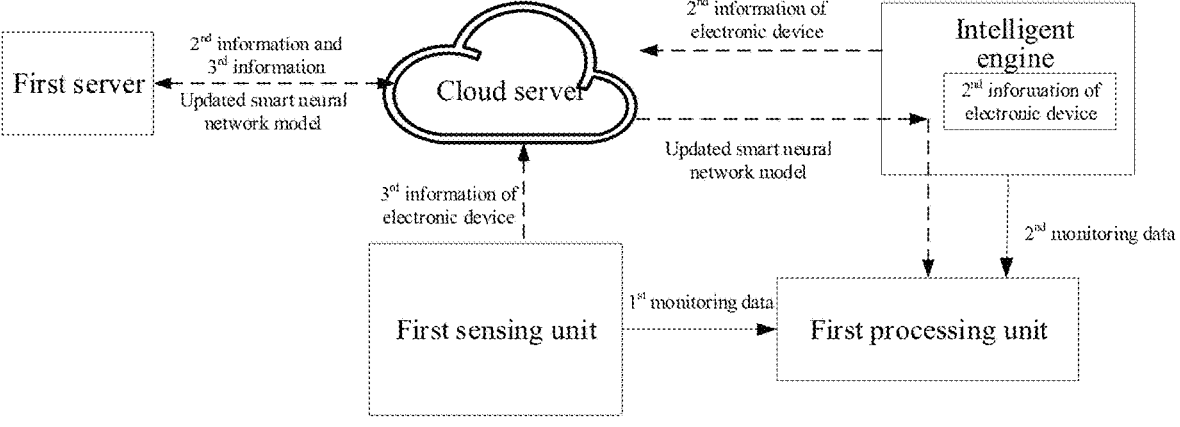
FIG. 12 is a schematic diagram of an implementation scene of another exemplary processing method according to some embodiments of the present disclosure.

FIG. 12 is a schematic diagram of an implementation scene of an exemplary processing method according to some embodiments of the present disclosure. As shown in FIG. 12, the first processing unit obtains the first monitoring data from the first sensing unit and the second monitoring data from the intelligent engine, and inputs the first monitoring data and the second monitoring data into the smart neural network model to obtain the application scenario of the electronic device determined by the smart neural network model. If the accuracy of the application scenario of the electronic device determined by the smart neural network model does not satisfy the accuracy threshold, the first processing unit controls the application scenario of the electronic device to be the general application scenario, and adjusts the target parameter of the target processing unit based on the general application scenario. The intelligent engine obtains the second information from the electronic device. The first sensing unit obtains the third information from the electronic device. The intelligent engine sends the second information from the electronic device to the cloud server. The first sensing unit sends the third information from the electronic device to the cloud server. As such, the first server obtains the second information and the third information from the cloud server, updates the smart neural network model based on the second information and the third information to improve the accuracy of the application scenario determined by the smart neural network model, and sends the updated smart neural network model to the cloud server for storage. Thus, the electronic device obtains the updated smart neural network model from the cloud server, thereby improving the accuracy of the target parameter adjustment and improving the user experience.

Figure 13:
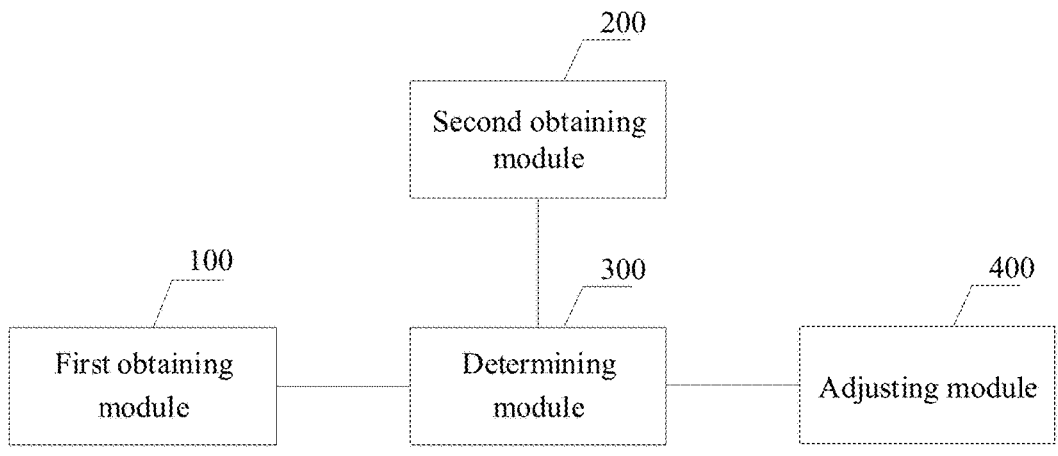
FIG. 13 is a schematic structural diagram of an exemplary processing device according to some embodiments of the present disclosure.

The present disclosure also provides a processing device. The processing device is used to perform the processing method as previously described. FIG. 13 is a schematic structural diagram of an exemplary processing device according to some embodiments of the present disclosure. As shown in FIG. 13, the processing device includes: a first obtaining module 100, a second obtaining module 200, a determining module 300, and an adjusting module 400.

The first obtaining module 100 is configured to obtain the first monitoring data from the first sensing unit. The first sensing unit monitors the target parameter provided by the power supply to the target processing unit. The target parameter represents the performance of the target processing unit in the running state.

The second obtaining module 200 is configured to obtain the second monitoring data from the intelligent engine. The intelligent engine in the running state manages the currently running target program.

The determining module 300 is configured to determine the application scenario of the electronic device through matching the first monitoring data and the second monitoring data with the smart scenario model.

The adjustment module 400 is configured to adjust the target parameter of the target processing unit based on the application scenario.

In some embodiments, the processing device may also include a configuration module configured to configure the management software for controlling the target processing unit through the intelligent engine. In some embodiments, the smart scenario model may be the smart neural network model, and the first processing unit may be a chip with a computing capability.

In some embodiments, the processing device may also include a control module configured to control the application scenario of the electronic device to be the general application scenario if the accuracy of the application scenario of the electronic device determined by the smart neural network model does not meet the accuracy threshold.

The present disclosure also provides a processing system. The processing system is used to perform the processing method as previously described. The processing system includes the first sensing unit configured to monitor the target parameter provided by the power supply to the target processing unit, the target parameter representing the performance of the target processing unit in the running state, the intelligent engine in the running state configured to manage the currently running target program, and the first processing unit configured to execute the disclosed processing method.

In some embodiments, the processing system may further include the cloud server and the first server. The intelligent engine is further configured to: obtain the first information of the electronic device, the first information representing the parameter information about the running state of the electronic device in the general application scenario, and send the first information to the cloud server, such that the first server obtains the first information from the cloud server, updates the smart neural network model based on the first information, and sends the updated smart neural network model to the cloud server for storage.

In some embodiments, the intelligent engine is further configured to: send the first request to the cloud server, and obtain the version information of the neural network model and the download address of the neural network model returned by the cloud server in response to the first request, and if the version information of the neural network model indicates that the current neural network model in the cloud server is newer than the neural network model of the electronic device, obtain the current neural network model in the cloud server based on the download address of the neural network model, and replace the smart neural network model of the electronic device with the current neural network model obtained from the cloud server.

It should be noted that each embodiment focuses on the difference from other embodiments, and the same and similar parts of the various embodiments can be referred to each other. Because the device embodiments are similar to the method embodiments, the description thereof is relatively simple, and for related parts, reference can be made to the description of the method embodiments.

In some embodiments, unless otherwise defined, the technical terms or scientific terms used in the description of the embodiments of the present disclosure should have the usual meanings understood by those skilled in the art to which the embodiments of the present disclosure belong. "first\second" and similar words used in the embodiments of the present disclosure do not indicate any order, quantity or importance, but are only used to distinguish similar components.

Those skilled in the art should understand that unless otherwise defined, all terms (including technical terms and scientific terms) used herein have the same meanings as those of ordinary skill in the art to which the embodiments of the present disclosure belong. It should also be understood that terms, such as those defined in commonly used dictionaries, should be understood to have meanings consistent with their meaning in the context of the prior art, and unless specifically defined as herein, are not intended to be idealized or overly formalized.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not mean the order of execution, which should be determined by its functions and internal logic, and should not constitutes any limitation on the implementation in the embodiments of the present disclosure. The sequence numbers of the above embodiments of the present disclosure are for description only, and do not represent the advantages and disadvantages of the embodiments.

It should be noted that, in the specification, the term "comprising", "including" or any other variation thereof is intended to cover a non-exclusive inclusion such that a process, method, article, or apparatus comprising a set of elements includes not only those elements, but also includes other elements not expressly listed, or elements inherent in the process, method, article, or device. Without further limitations, an element defined by the phrase "comprising a . . . " does not preclude the presence of additional identical elements in the process, method, article, or apparatus comprising that element.

For the convenience of description, when describing the above device, functions are divided into various modules and described separately. Of course, when implementing the embodiments of the present disclosure, the functions of each module can be implemented in one or more pieces of software and/or hardware.

It can be known from the above description of the implementation manners that those skilled in the art can clearly understand that the present disclosure can be implemented by means of software plus a necessary general hardware platform. Based on this understanding, the technical solution of the present disclosure or the part that contributes to the prior art can be embodied in the form of software products, and the computer software products can be stored in storage media, such as a ROM/RAM, a magnetic disk, an optical disc, etc., including program instructions to enable a computer device (e.g., a personal computer, a server, or a network device, etc.) to execute the methods described in various embodiments or some parts of the embodiments of the present disclosure.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. A processing method, comprising:

obtaining, by a first processing unit, a first monitoring data from a first sensing unit, the first sensing unit monitoring a target parameter provided by a power supply to a target processing unit, and the target parameter representing performance of the target processing unit in a running state;

obtaining, by the first processing unit, a second monitoring data from an intelligent engine, the intelligent engine in the running state managing a currently running target program;

matching, by the first processing unit, the first monitoring data and the second monitoring data with a smart scenario model to determine an application scenario of an electronic device; and adjusting, by the first processing unit, the target parameter of the target processing unit based on the application scenario.

2. The processing method according to claim 1, further comprising:

configuring, by the first processing unit, a management software controlling the target processing unit through the intelligent engine.

3. The processing method according to claim 1, wherein: the smart scenario model is a smart neural network model, and the first processing unit is a chip with a computing capability.

4. The processing method according to claim 3, further comprising:

in response to an accuracy of the application scenario of the electronic device determined by the smart neural network model not satisfying an accuracy threshold, controlling the application scenario of the electronic device to be a general application scenario.

5. The processing method according to claim 4, further comprising:

obtaining, by the intelligent engine, first information from the electronic device, the first information representing parameter information about the running state of the electronic device in the general application scenario; and sending, by the intelligent engine, the first information to a could server, such that a first server obtains the first information from the cloud server, updates the smart neural network model based on the first information, and sends the updated smart neural network model to the cloud server for storage.

6. The processing method according to claim 3, wherein the smart neural network model is obtained by:

sending, by the intelligent engine, a first request to the cloud server, and obtaining version information of a current neural network model and a download address of the current neural network model returned by the cloud server in response to the first request; and in response to the version information of the current neural network model indicating that the current neural network model in the cloud server being newer than the smart neural network model of the electronic device, obtaining, by the intelligent engine, the current neural network model in the cloud server based on the download address of the current neural network model, and replacing the smart neural network model of the electronic device with the current neural network model obtained from the cloud server.

7. A processing device, comprising:

a memory storing program instructions; and a processor coupled to the memory;

wherein when being executed by the processor, the program instructions cause the processor to:

obtain a first monitoring data from a first sensing unit, the first sensing unit monitoring a target parameter provided by a power supply to a target processing unit, and the target parameter representing performance of the target processing unit in a running state;

manage a currently running target program through an intelligent engine in the running state;

obtain a second monitoring data from the intelligent engine;

match the first monitoring data and the second monitoring data with a smart scenario model to determine an application scenario of an electronic device; and adjust the target parameter of the target processing unit based on the application scenario.

8. The processing device according to claim 7, wherein the processor is further configured to:

configure a management software controlling the target processing unit through the intelligent engine.

9. The processing device according to claim 7, wherein: the smart scenario model is a smart neural network model.

10. The processing device according to claim 9, wherein the processor is further configured to:

in response to an accuracy of the application scenario of the electronic device determined by the smart neural network model not satisfying an accuracy threshold, control the application scenario of the electronic device to be a general application scenario.

11. The processing device according to claim 10, wherein the processor is further configured to:

obtain first information from the electronic device, the first information representing parameter information about the running state of the electronic device in the general application scenario; and send the first information to a could server, such that a first server obtains the first information from the cloud server, updates the smart neural network model based on the first information, and sends the updated smart neural network model to the cloud server for storage.

12. The processing device according to claim 9, wherein the processor is further configured to:

send a first request to the cloud server, and obtain version information of a current neural network model and a download address of the current neural network model returned by the cloud server in response to the first request; and in response to the version information of the current neural network model indicating that the current neural network model in the cloud server being newer than the smart neural network model of the electronic device, obtain the current neural network model in the cloud server based on the download address of the current neural network model, and replace the smart neural network model of the electronic device with the current neural network model obtained from the cloud server.

13. A processing system, comprising:

a first sensing unit configured to monitor a target parameter provided by a power supply to a target processing unit, the target parameter representing performance of the target processing unit in a running state; and a first processing unit configured to:

obtain a first monitoring data from the first sensing unit;

manage a currently running target program through an intelligent engine in the running state;

obtain a second monitoring data from the intelligent engine;

match the first monitoring data and the second monitoring data with a smart scenario model to determine an application scenario of an electronic device; and adjust the target parameter of the target processing unit based on the application scenario.

14. The processing system according to claim 13, wherein the first processing unit is further configured to:

configure a management software controlling the target processing unit through the intelligent engine.

15. The processing system according to claim 13, wherein:

the smart scenario model is a smart neural network model.

16. The processing system according to claim 15, wherein the first processing unit is further configured to:

in response to an accuracy of the application scenario of the electronic device determined by the smart neural network model not satisfying an accuracy threshold, control the application scenario of the electronic device to be a general application scenario.

17. The processing system according to claim 16, wherein the first processing unit is further configured to, through the intelligent engine:

obtain first information from the electronic device, the first information representing parameter information about the running state of the electronic device in the general application scenario; and send the first information to a could server, such that a first server obtains the first information from the cloud server, updates the smart neural network model based on the first information, and sends the updated smart neural network model to the cloud server for storage.

18. The processing system according to claim 15, wherein the first processing unit is further configured to, through the intelligent engine:

send a first request to the cloud server, and obtain version information of a current neural network model and a download address of the current neural network model returned by the cloud server in response to the first request; and in response to the version information of the current neural network model indicating that the current neural network model in the cloud server being newer than the smart neural network model of the electronic device, obtain the current neural network model in the cloud server based on the download address of the current neural network model, and replace the smart neural network model of the electronic device with the current neural network model obtained from the cloud server.

* * * * *